W. ABRAHAMS.
LINING FOR SLEEVES.
APPLICATION FILED MAR. 3, 1914.
1,106,912.
Patented Aug. 11, 1914.
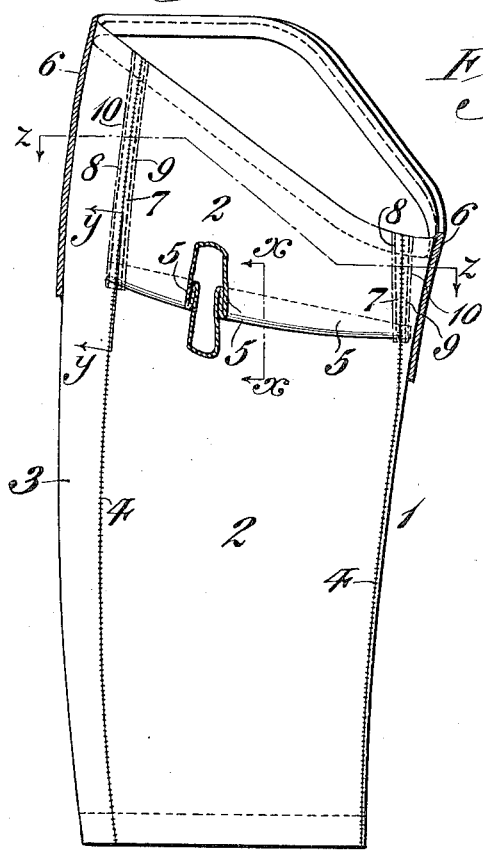
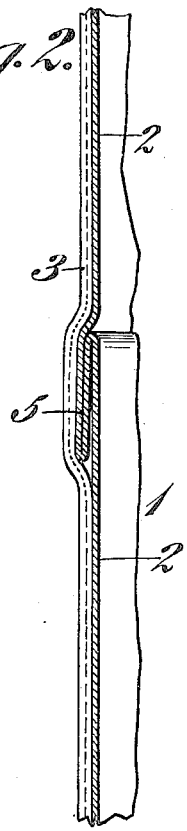
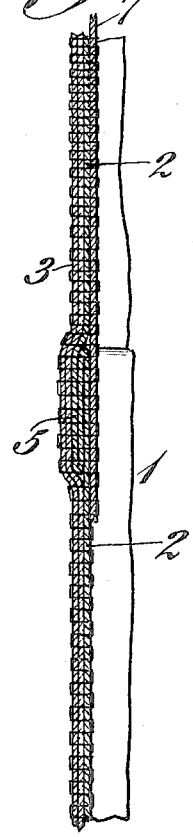
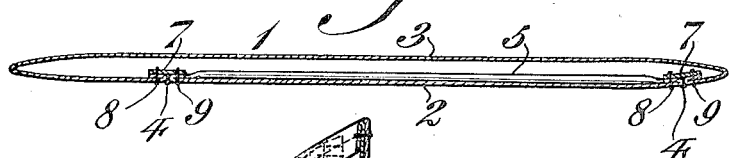
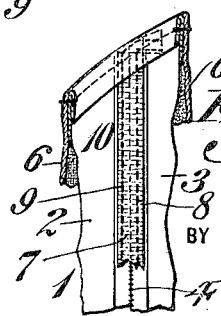
WITNESSES
INVENTOR
William Abrahams.
BY
ATTORNEYS

UNITED STATES PATENT OFFICE.

WILLIAM ABRAHAMS, OF PHILADELPHIA, PENNSYLVANIA.

LINING FOR SLEEVES.

1,106,912.

Specification of Letters Patent. Patented Aug. 11, 1914.

Application filed March 3, 1914. Serial No. 822,119.

*To all whom it may concern:*

Be it known that I, WILLIAM ABRAHAMS, a citizen of the United States, residing in the city and county of Philadelphia, State of Pennsylvania, have invented a new and useful Lining for Sleeves, of which the following is a specification.

My invention consists of a lining for the sleeve of a coat or similar garment, which is adapted to yield in the length thereof, so as to relieve the shoulder and wrist portions of the sleeve of strain, and prevent disconnection of the sleeve at said places.

It further consists of means for reinforcing the connection of the yielding member of the lining with the adjacent portion of the sleeve, so that the same is well adapted to resist the strain to which it may be subjected by the arm of the wearer in pulling on, and taking off the garment.

The invention is satisfactorily illustrated in the accompanying drawing, but the important instrumentalities thereof may be varied, and so it is to be understood that the invention is not limited to the specific details shown and described.

Figure 1 represents a side elevation, partly in section, of a lining of a sleeve embodying my invention, a portion of the sleeve being shown in longitudinal section. Fig. 2 represents a longitudinal section of a portion thereof on the line x—x Fig. 1, on an enlarged scale. Fig. 3 represents a longitudinal section of a portion thereof on the line y—y, Fig. 1, on an enlarged scale. Fig. 4 represents a transverse section on the line z—z, Fig. 1, on an enlarged scale. Fig. 5 represents a perspective view of a portion of the lining taken from the interior thereof and an adjacent portion of the sleeve in section.

Similar numerals of reference indicate corresponding parts in the figures.

Referring to the drawings:—1 designates a lining of a coat sleeve, the same being formed of pieces 2 and 3 of fabric which are united on the lines of the longitudinally-extending seams 4, as usual in such cases.

In the length of the piece 2 there is the plait 5 which is formed preferably by folding the material of the piece on itself in the transverse direction of the sleeve, the terminals of the plait being united with the sleeve at the seam 4 thereof, the transverse lengths of the plait being disconnected from the sleeve and consequently left free between said terminals by which provision when the garment is being put on or removed, as the hands and arms of the wearer pass said plait, the members of the latter yield or give to a certain extent, thus increasing the length of the lining whereby the sewing or stitches of the places of connection of the lining with the sleeve 6 are relieved of severe strain, and so prevented from being torn out thereby disengaging the lining from the sleeve. When the sleeve is in proper position, the members of the plait being relieved of said strain resume their normal positions, folding flat on each other without affecting the general condition and appearance of the lining.

In order to strengthen the connection of the terminals of the plait, I apply to the same the stays 7, which are placed over said terminals, so as to overlap the seams 4 of the lining at the sides thereof, and secure the same to the lining by the rows of stitches 8 and 9, which are respectively on opposite sides of said seams 4, and form a plurality of fastenings for each stay with the relative portions of the lining. The stays are extended as at 10 from the plait upwardly to the top of the lining and so increase the strength of the upper portions of the latter along the seams 4, and enables the lining and consequently to endure the downward strain to which they may be subjected from the shoulder of the garment.

Having thus described my invention what I claim as new and desire to secure by Letters Patent, is:—

1. A lining for a sleeve provided in the length thereof with a transversely extending plait, said plait being held in form by securing means at its terminal portions only, leaving the portion intermediate its terminals free to expand.

2. A lining for a sleeve provided in the length thereof with a transversely extending plait, said plait being held in form by securing means at its terminal portions only, leaving the portion intermediate its terminals free to expand, and a stay piece secured to the lining over said terminals.

3. A lining for a sleeve comprising a plurality of sections connected by longitudinal seams, one of said sections being provided in the length thereof with a transversely-extending plait, the same having its terminals connected firmly with the adjacent portions of the lining, a stay over said terminals, and a plurality of means adapted to secure said stay to said terminals respectively at the longitudinally-extending seams in the lengths of said lining.

4. A lining for a sleeve provided in the length thereof with a transversely extending plait, said plait being held in form by securing means at its terminal portions only, leaving the portion intermediate its terminals free to expand, and a stay piece secured to the lining over said terminals, said stay having an extension from said plait to the top of the lining and secured throughout its length to the lining.

WILLIAM ABRAHAMS.

Witnesses:
LOUIS A. HIRSCH,
ARTHUR BAKER.

Copies of this patent may be obtained for five cents each, by addressing the "Commissioner of Patents, Washington, D. C."